United States Patent [19]
Braceras et al.

[11] Patent Number: 5,815,354
[45] Date of Patent: Sep. 29, 1998

[54] RECEIVER INPUT VOLTAGE PROTECTION CIRCUIT

[75] Inventors: George Maria Braceras, Colchester; John Connor, Burlington; Donald Albert Evans, Williston, all of Vt.

[73] Assignee: International Business Machines Corporation, Armonk, N.Y.

[21] Appl. No.: 821,497

[22] Filed: Mar. 21, 1997

[51] Int. Cl.[6] .................................................. H02H 9/00
[52] U.S. Cl. .............................. 361/56; 361/91; 361/111
[58] Field of Search .......................... 361/54, 56, 18, 361/88, 91

[56] References Cited

U.S. PATENT DOCUMENTS

| | | |
|---|---|---|
| 4,405,964 | 9/1983 | Woods et al. ............................ 361/18 |
| 4,580,063 | 4/1986 | Torelli et al. ......................... 307/200 B |
| 4,835,650 | 5/1989 | Epstein ....................................... 361/56 |
| 5,036,215 | 7/1991 | Masleid et al. ........................... 307/243 |
| 5,126,596 | 6/1992 | Millman .................................... 307/451 |
| 5,528,447 | 6/1996 | McManus et al. ......................... 361/91 |

*Primary Examiner*—Jeffrey A. Gaffin
*Assistant Examiner*—Sally C. Medley
*Attorney, Agent, or Firm*—Robert A. Walsh

[57] ABSTRACT

An off-chip receiver circuit for interfacing an integrated circuit of a 2.5 Volt CMOS technology to a 3.3 Volt LVTTL bus. The off-chip receiver includes protection circuitry for preventing overstressing of the gate oxide caused by undershoot/overshoot peaks of −1 volt to 6 volts on the input.

16 Claims, 4 Drawing Sheets

RECEIVER INPUT VOLTAGE PROTECTION CIRCUIT

FIELD OF THE INVENTION

The present invention relates to input/output circuits for integrated circuits which include voltage protection circuitry so that input/output circuits fabricated in a lower voltage technology may be interfaced to higher voltage buses.

BACKGROUND OF THE INVENTION

In integrated circuit technology, devices in different integrated circuit (hereinafter referred to as "IC") packages are interconnected to one another at I/O PADS associated with each IC package. I/O PADS are associated with electrical circuits which perform a desired function to interface with other IC packages or electrical devices. An I/O PAD may be associated with electrical circuits which generate output signals and apply the signals to the I/O PAD for external devices to sense and process accordingly. Alternatively, an I/O PAD may be associated with electrical circuits which sense the logic state of signals applied to the I/O PAD by external electrical circuits or IC packages. I/O PADS are frequently "bi-directional" in the sense that they may be used at different times for the sensing of input signals to the IC package or for the application of output signals from the IC package. Electrical output signals are applied to an I/O PAD by electrical circuits within the IC package associated with the I/O PAD. Similarly, electrical input signals are received as input signals from an I/O PAD by associated electrical circuits within the IC package which "sense" the signal level and operate accordingly.

It is common for such interconnected circuits to utilize standard voltage levels to represent logic states of "0" and "1". Common standard voltage levels in the past have been 0 Volts (±a threshold value) to represent one logic state and 5 Volts (±a threshold value) to represent the other logic state. As new IC manufacturing technologies evolve, the voltage levels used may change. For example, in the manufacture of many current IC devices using sub-micron semiconductor fabrication processes, the semiconductor industry has begun to standardize on 3 Volt (more precisely, 3.3 Volt ±a threshold value) in place of 5 Volt signal levels to improve performance and reduce power dissipation. The lower voltage level permits reduced thickness in transistor gate oxide materials to thereby reduce switching time of transistor gates and improve performance of the switching circuitry.

As gate oxide thickness is reduced in advanced low voltage CMOS technologies protecting the input/output circuit's dielectrics from over-voltage conditions becomes necessary when interfacing to higher voltage buses. What is needed is an input circuit fabricated in a 2.5 Volt CMOS technology which is compatible with a 3.3 Volt low voltage transistor-transistor logic (LVTTL) bus wherein protection is provided to prevent overstressing gate oxide in the input circuit where undershoot/overshoot peaks of −1 Volt to 6 Volts can occur on the input.

SUMMARY OF THE INVENTION

Accordingly, the present invention provides an input circuit for an integrated circuit operating within a first voltage range comprising an input for receiving an input signal and a protection circuit protecting the input circuit from voltages of the input signal which are not within the first voltage range. The protection circuit includes a pass transistor having a first contact coupled to the input, a second contact coupled to a first node, and a third contact coupled to a pass node for passing the voltages of the input signal applied to the first contact to the second contact. The protection circuit further includes modulation means for modulating the voltage at the pass node in response to the voltage at the first node from a first voltage level, set to protect the pass transistor, to a predetermined limit and means for clamping the voltage at the first node in response to the voltage at the pass node reaching the predetermined limit to thereby protect devices coupled to the first node.

The present invention also includes a method for protecting an input circuit operably associated with an integrated circuit operating within a first voltage range from an input signal having voltages which are not within the first voltage range. The method comprises the steps of providing a pass transistor having a first contact, a second contact coupled to a first node, and a third contact coupled to a pass node; passing the voltages of the input signal through the pass transistor from the first contact to the second contact; modulating the voltage at the pass node in response to the voltage at the first node from a first level set to protect the pass transistor to a predetermined limit; and clamping the voltage at the first node in response to the voltage at the pass node reaching the predetermined limit to thereby protect devices coupled to the first node.

The present invention advantageously protects input circuits fabricated in a 2.5 Volt CMOS technology from damage due to application of an input signal from a 3.3 Volt LVTTL bus having voltage undershoot/overshoot peaks of −1 Volt to 6 Volts.

The present invention also provides the advantage of minimizing the power dissipated and drawn when the input circuit is not in use.

DETAILED DESCRIPTION OF A PREFERRED EMBODIMENT OF THE INVENTION

Figure 1:
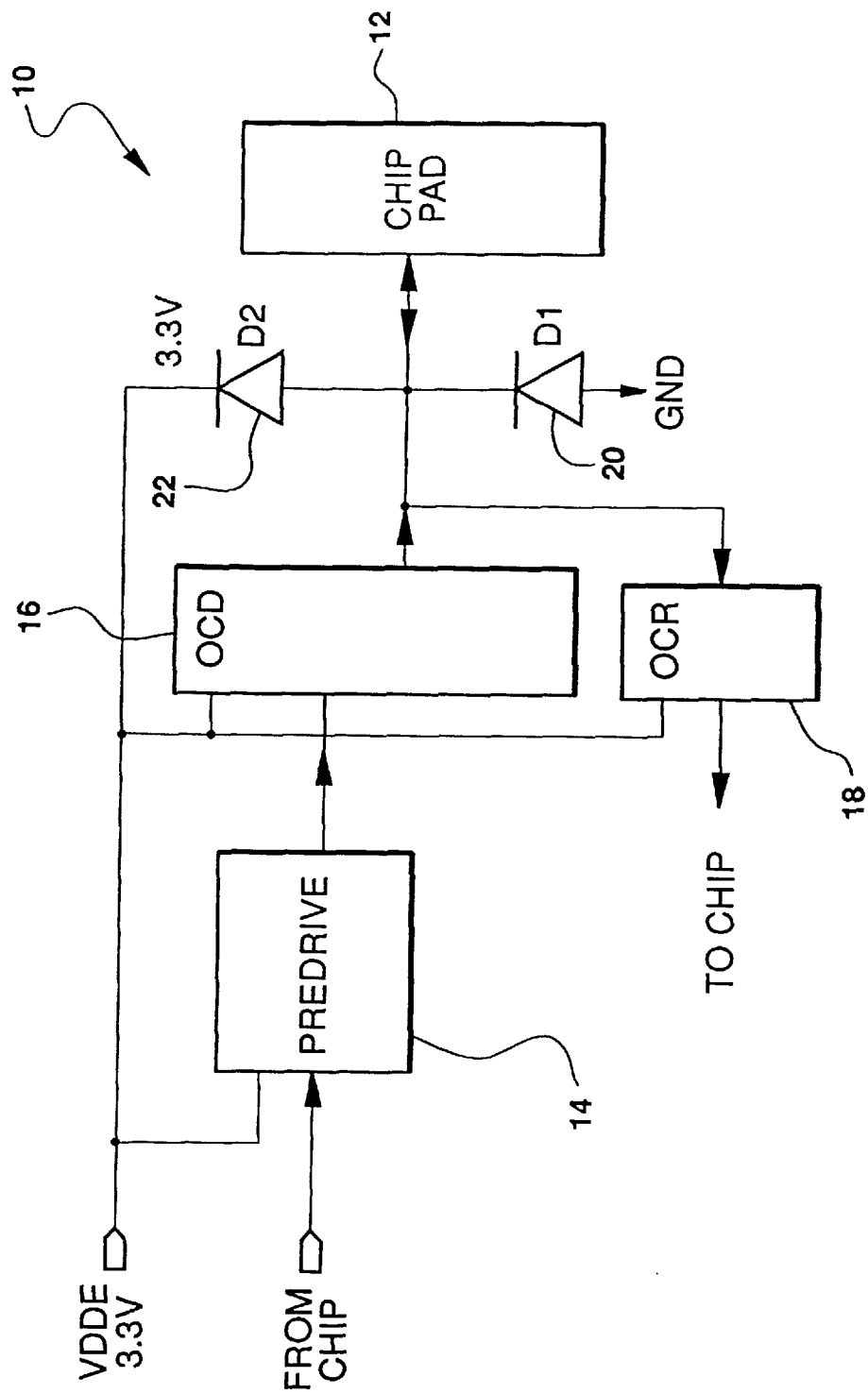
FIG. 1 is a block circuit diagram of an I/O pad having an associated functional I/O circuitry embodying the present invention

FIG. 1 illustrates an I/O circuit 10 for an integrated circuit such as SRAM operating within a first voltage range, such as 0–2.5 Volts for a CMOS-based technology. Input/output circuit 10 includes an I/O pad 12 for inputting or outputting electrical signals from or to external circuits (not shown) such as an integrated circuit. Thus, input/output pad 12 is bidirectional. Input/output circuit 10 further includes pre-drive circuit 14, off-chip driver 16, off-chip receiver 18, and diodes 20 and 22. Predrive circuit 14 and off-chip driver 16 are active when the SRAM is driving the bidirectional input/output pad 12. Diodes 20 and 22 are for ESD (Electrostatic Discharge) protection.

Figure 2:
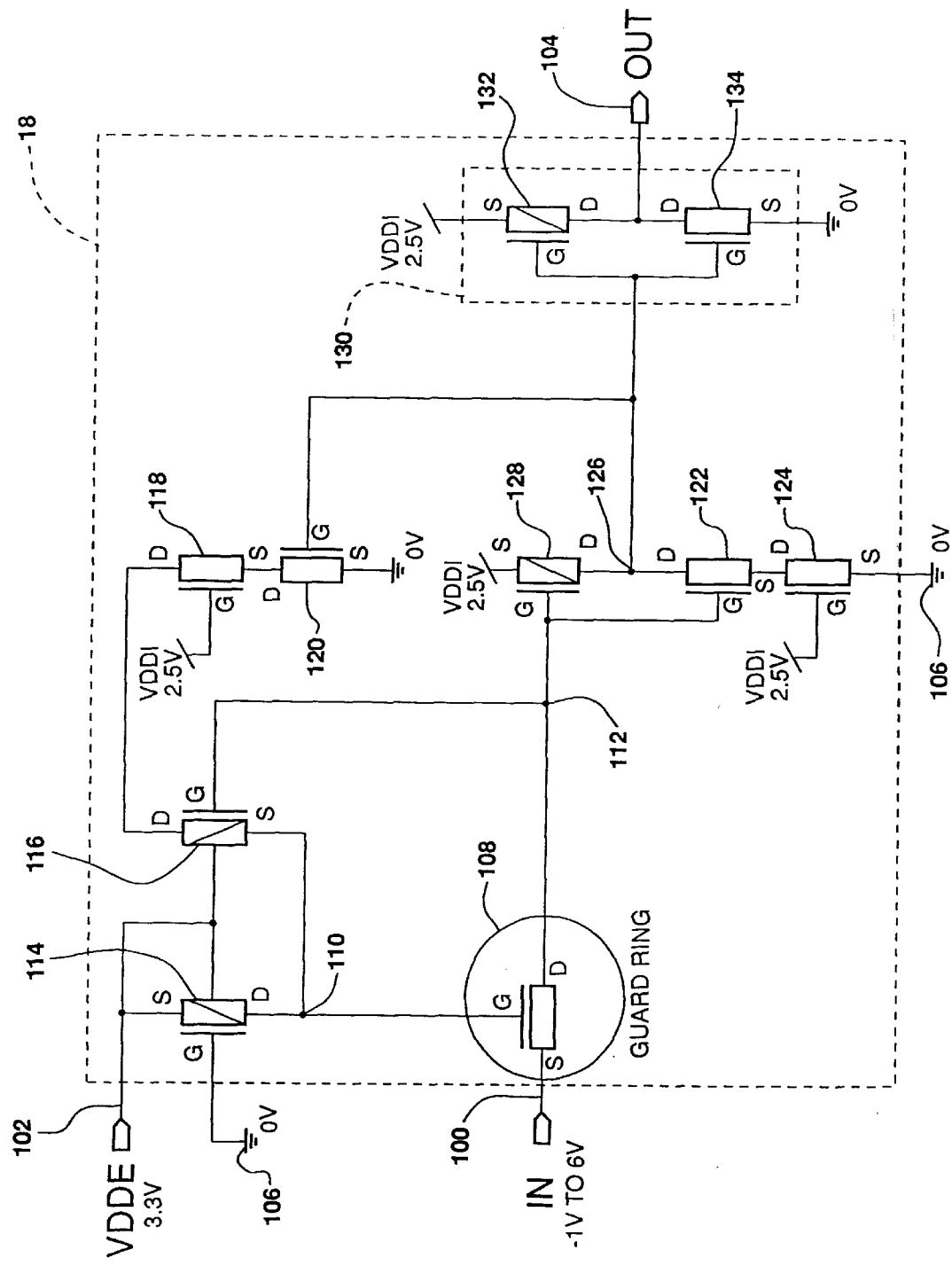
FIG. 2 is a circuit diagram of an input circuit according to the present invention.

Referring now to FIG. 2, an input circuit according to the present invention is shown, and in particular, off-chip receiver 18 is shown to reveal the present invention. Off-chip receiver 18 includes an input 100 for receiving an input signal which varies within a range from −1 Volt to 6 Volts. Off-chip receiver 18 further includes a voltage input 102 which, in the preferred embodiment, is 3.3 Volts. The off-chip receiver 18 further includes an output 104 and a ground input 106.

Off-chip receiver 18 is preferably used in an I/O circuit fabricated in a 2.5 V CMOS technology with a gate dielectric stress limit of approximately 3.6 V. Chips utilizing 2.5 V CMOS technologies require interfacing with buses that drive as high as 3.6 Volts. Off-chip receiver 18 of the present invention includes voltage protection circuitry designed to satisfy the 3.6 maximum voltage stress across devices.

In the following description, VDDE is an externally applied voltage of 3.3 Volts at 102, and VDDI is the internal core regulated voltage of 2.5 Volts.

Still referring to FIG. 2, off-chip receiver 18 includes a first n type field effect transistor (NFET) 108 having its source contact coupled to input 100, its gate contact connected or coupled to a pass node 110, and its drain contact coupled to a first node 112. Off-chip receiver 18 further includes a DC conduction path from voltage input 102 to ground 106. The DC conduction path includes P-type transistor 114, P-type transistor 116, N-type transistor 118, and N-type transistor 120.

The gate of transistor 114 is coupled to ground 106, and its source is coupled to voltage input 102 and its drain to pass node 110. A fourth contact (N Well) of transistor 114 is coupled to the source of transistor 114 and voltage input 102.

The source of transistor 116 is coupled to pass node 110, and the drain of transistor 116 is coupled to the drain of transistor 118. The gate of transistor 116 is coupled to first node 112. The fourth contact of transistor 116 is coupled to voltage input 102. The source of transistor 118 is coupled to the drain of transistor 120. The gate of transistor 118 is coupled to VDDI. The source of transistor 120 is coupled to ground, and the gate of transistor 120 is coupled to a second node 126.

Second node 126 is coupled to the drain of transistor 122. The gate of transistor 122 is coupled to the first node 112. The source of transistor 122 is coupled to the drain of transistor 124. The gate of transistor 124 is coupled to VDDI. The source of transistor 124 is coupled to ground. Receiver 18 further includes a P-type transistor 128. The gate of transistor 128 is coupled to first node 112 and to the gate of transistor 122. The drain of transistor 128 is coupled to second node 126, and the source of transistor 128 is coupled to VDDI. Second node 126 is coupled to an inverter 130. Inverter 130 is in turn coupled to output 104.

Inverter 130 includes a P-type transistor 132 and an N-type transistor 134. The gates of transistors 132 and 134 are coupled to second node 126. The drains of transistors 132 and 134 are coupled to output 104. The source of transistor 132 is coupled to VDDI, and the source of transistor 134 is coupled to ground.

Transistor 108 passes the voltage at input 100 to node 112. Transistors 128, 122, and 124 determine the input voltage switch point from nodes 112 to 126. The gate of transistor 108 is modulated depending on the voltage at node 112. When the voltage at input 100 transitions to a low voltage, node 112 follows the input, and node 126 transitions to VDDI, and transistors 116 and 120 turn on, enabling a DC conduction path from VDDE to ground through transistors 114, 116, 118, and 120. The ratio of transistors 114, 116, 118, and 120 causes pass node 110 to transition to 2.5 Volts, thus protecting transistor 108 from voltage stress when the voltage at input 100 goes to an extreme negative voltage such as −1 Volt. When the voltage at input 100 transitions to a high voltage, node 112 follows the input, and node 126 transitions to ground, cutting off the DC conduction path from VDDE to ground through transistors 114, 116, 118, and 120 and allowing pass node 110 to transition to VDDE. With pass node 110 at VDDE, node 112 can transition as high as VDDE minus the threshold voltage drop, Vt, from pass node 110 to node 112. To summarize FIG. 2, transistor 108 passes a safe high voltage while protecting transistors 128, 122 from excessively high input voltages (up to 6 Volts).

Figure 3:
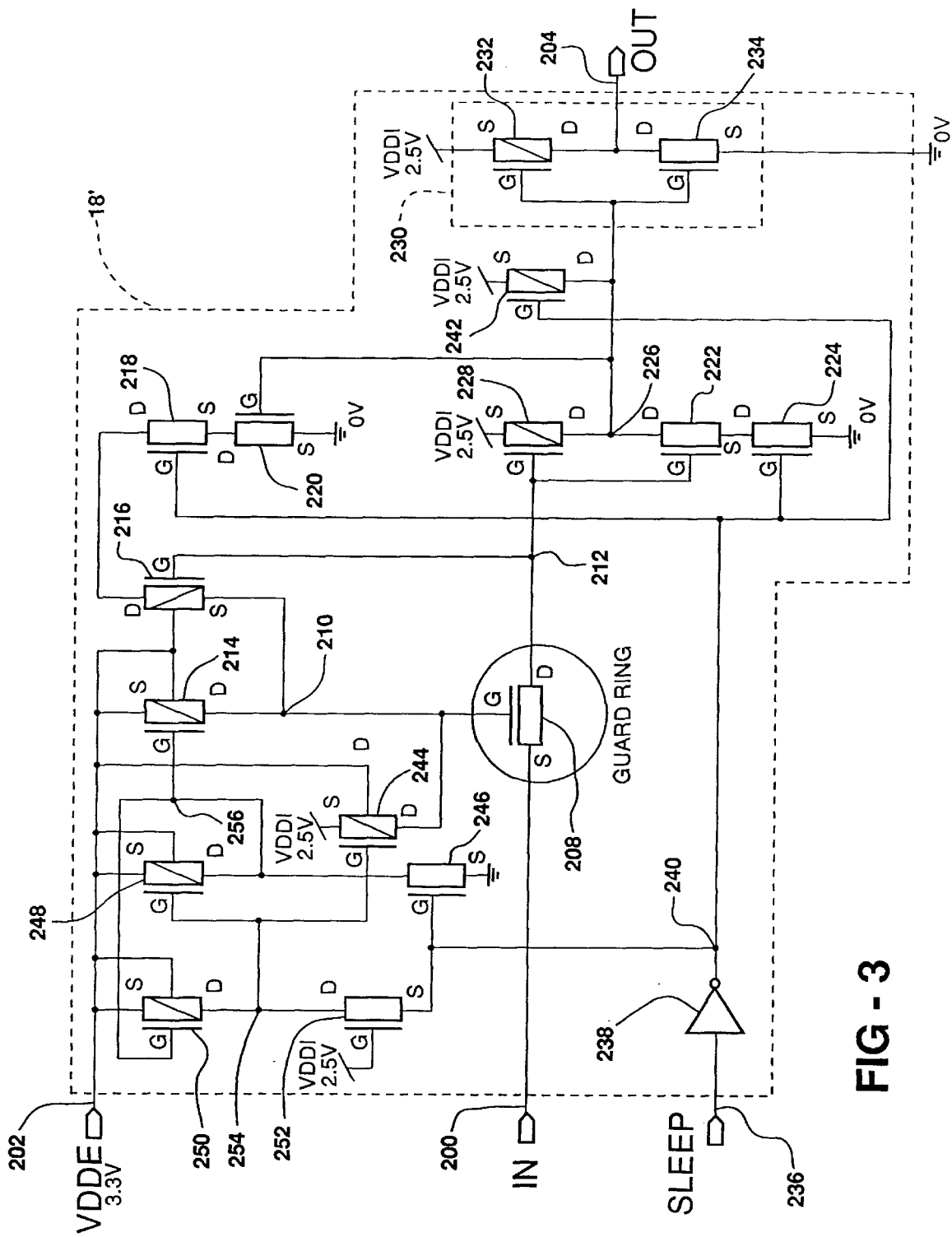
FIG. 3 is a circuit diagram of an alternative embodiment of an input circuit according to the present invention.

FIG. 3 a is circuit block diagram illustrating an alternative embodiment of the input circuit according to the present invention. Reference numerals which are like or similar to the reference numerals in FIG. 2 represent like, similar, or identical components.

Since the circuit of FIG. 3 contains a DC conduction path when the voltage at input 100 is low, FIG. 3 illustrates an alternative embodiment of receiver 18 of FIG. 2 illustrating a modification to include a low current standby mode when receiver 18' is not in use. The modification causes pass node 210 to remain at VDDI and output 204 to remain at ground when a sleep input 236 is asserted.

The following description describes those devices which are added to or modified from receiver 18 of FIG. 2. Sleep input 236 is coupled to an inverter 238. Inverter 238 is coupled to sleep node 240. Sleep node 240 is coupled to the gates of transistors 218 and 224 which is a modification from transistors 118 and 124 in FIG. 2, wherein the gates were coupled to VDDI.

Receiver 18' further includes a P-type transistor 242. The source of transistor 242 is coupled to VDDI, the drain to second node 226 and the gate to sleep node 240. To further implement the sleep function in receiver 18', receiver 18' further includes a P-type transistor 244, an N-type transistor 246, a P-type transistor 248, a P-type transistor 250, and an N-type transistor 252. The drain of transistor 244 is coupled to pass node 210, the source to VDDI, and the gate to a first intermediate node 254. Instead of the gate of transistor 214 being coupled to ground as in FIG. 2, the gate is coupled to a second intermediate node 256. The drain of transistor 246 is coupled to the second intermediate node 256. The source of transistor 246 is coupled to ground, and the gate is coupled to sleep node 240. The source of transistor 252 is coupled to sleep node 240, the gate to VDDI, and the drain to the first intermediate node 254. The gate of transistor 250 is coupled to second intermediate node 256, the drain to first intermediate node 254, the source to VDDE, and the fourth contact also to VDDE.

The gate of transistor 248 is coupled to the first intermediate node 254, the source to VDDE, and the drain to the second intermediate node 256. The fourth contact of transistor 248 is coupled to VDDE.

Transistors 250, 248, 252, and 246 are used to control the gates of transistors 214 and 244 in response to sleep node 240. In active mode, transistor 246 brings intermediate node 256 to ground level, turning transistor 214 "on." Intermediate node 254 is pulled to VDDE level by transistor 250, turning transistor 244 "off." In sleep mode, sleep node 240 is low, which is passed to intermediate node 254 through transistor 252, turning transistor 244 "on." Transistor 248 pulls intermediate node 256 to VDDE level, turning transistor 214 "off." In this state, node 210 is held to VDDI level by transistor 244.

Figure 4:
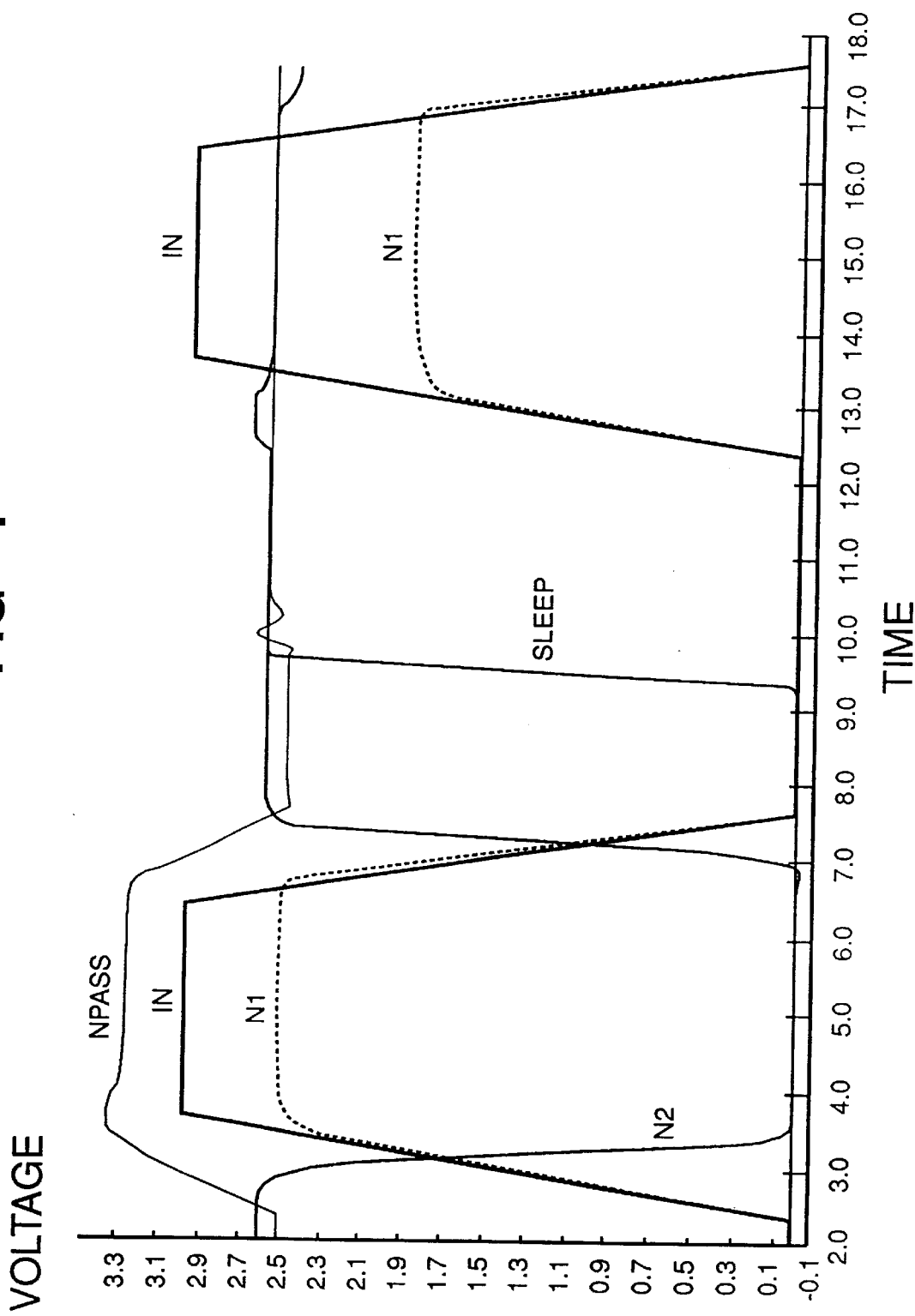
FIG. 4 illustrates a graphical simulation of the input circuit of FIG. 3.

FIG. 4 illustrates the results of a simulation of the circuit of FIG. 3. Shown are voltages at input 200, IN, at sleep input 236, SLEEP, at first node 212, N1, at second node 226, N2, and at the pass node 210, NPASS. The node of critical interest is the pass node NPASS as the input IN transitions.

The first half of the simulation shows the circuit in active mode, and the latter half of the simulation shows the circuit in the low current mode activated by bringing the voltage at sleep input 236 high.

Although the present invention and its advantages have been described in detail, it should be understood that various changes, substitutions and alterations can be made herein without departing from the spirit or scope of the invention as defined in the appended claims.

What is claimed is:

1. An input circuit for an integrated circuit operating within a first voltage range comprising:
   an input for receiving an input signal;
   circuit means for protecting said input circuit from voltages of said input signal which are not within said first voltage range, said circuit means comprising:
      an NFET pass transistor having a first contact coupled to said input, a second contact coupled to a first node, a third contact coupled to a pass node, and means for passing the voltage of said input signal applied to said first contact to said second contact;
   modulation means for modulating the voltage at said pass node in response to the voltage at said first node from a first level, set to protect said pass transistor, to a predetermined limit; and
   means for clamping the voltage at said first node in response to the voltage at said pass node reaching said predetermined limit to thereby protect devices coupled to said first node.

2. The input circuit, as recited in claim 1, wherein said modulation means includes a DC conduction path from a first voltage source to ground.

3. The input circuit, as recited in claim 2, further comprising a sleep circuit means for limiting current flow in said DC conduction path when said circuit means is not in use.

4. The input circuit, as recited in claim 3, wherein said circuit means includes an output and wherein said sleep circuit means includes means for maintaining said pass node at a predetermined voltage and said output at ground.

5. The input circuit, as recited in claim 2, further comprising:
   a first transistor having a first contact coupled to said first node and a second contact coupled to a second node; and
   a second transistor having a first contact coupled to said first node and a second contact coupled to said second node.

6. The input circuit, as recited in claim 5, wherein said first transistor has a third contact coupled to a second voltage source and said second transistor has a third contact operably coupled to ground such that the voltage at said second node varies within said first voltage range in response to the voltage at said first node.

7. The input circuit, as recited in claim 6, wherein said DC conduction path includes:
   a third transistor having first and second contacts coupled to said first voltage source, a third contact coupled to ground, and a fourth contact coupled to said pass node;
   a fourth transistor having a first contact coupled to said first and second contacts of said third transistor, a second contact coupled to said pass node, a third contact coupled to said first node, and a fourth contact;
   a fifth transistor having a first contact coupled to said fourth contact of said fourth transistor, a second contact coupled to the second voltage source, and a third contact; and
   a sixth transistor having a first contact coupled to said third contact of said fifth transistor, a second contact coupled to ground, and a third contact coupled to said second node and said second contact of said second transistor.

8. The input circuit, as recited in claim 5, wherein said first and second nodes are coupled to said DC conduction path for controlling the voltage at said pass node.

9. A method for protecting an input circuit for an integrated circuit operating within a first voltage range from an input signal having voltages which are not within the first voltage range, said method comprising the steps of:
   providing an NFET pass transistor having a first contact, a second contact coupled to a first node, and a third contact coupled to a pass node;
   passing the voltages of said input signal through said pass transistor from the first contact to the second contact;
   modulating the voltage at the pass node in response to the voltage at the first node from a first level, set to protect the pass transistor, to a predetermined limit; and
   clamping the voltage at the first node in response to the voltage at the pass node reaching the predetermined limit to thereby protect devices coupled to the first node.

10. The method, as recited in claim 9, further comprising the step of providing a DC conduction path from a first voltage source to ground.

11. The method, as recited in claim 10, further comprising the step of limiting the current in the DC conduction path when the input circuit is not in use.

12. The method, as recited in claim 11, further comprising the steps of maintaining the pass node at a predetermined voltage and an output of the input circuit at ground.

13. The method, as recited in claim 10, further comprising the step of providing:
   a first transistor having a first contact coupled to the first node and a second contact coupled to a second node; and
   a second transistor having a first contact coupled to the first node and a second contact coupled to the second node.

14. The method, as recited in claim 13, further comprising the step of providing the first transistor with a third contact coupled to a second voltage source and the second transistor with a third contact operably coupled to ground such that the voltage at the second node varies within the first voltage range in response to the voltage at the first node.

15. The method, as recited in claim 13, wherein the first and second nodes are coupled to the DC conduction path for controlling the voltage at the pass node.

16. The method, as recited in claim 13, wherein said step of providing a DC conduction path includes the steps of providing:
   a third transistor having a first and second contact coupled to said first voltage source, a third contact coupled to ground, and a fourth contact coupled to said pass node;
   a fourth transistor having a first contact coupled to said first and second contacts of said third transistor, a second contact coupled to said pass node, a third contact coupled to said first node, and a fourth contact;
   a fifth transistor having a first contact coupled to said fourth contact of said fourth transistor, a second contact coupled to a second voltage source, and a third contact; and
   a sixth transistor having a first contact coupled to said third contact of said fifth transistor, a second contact coupled to ground, and a third contact coupled to said second node and said second transistor.

* * * * *